United States Patent
Tanabe et al.

(10) Patent No.: US 10,496,365 B2
(45) Date of Patent: Dec. 3, 2019

(54) ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Manabu Sakuma, Yokohama (JP); Hideki Morita, Yokohama (JP); Isao Masuike, Machida (JP); Yasuhiro Ueno, Yokohama (JP); Koutaro Yamauchi, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/890,625

(22) Filed: Feb. 7, 2018

(65) Prior Publication Data
US 2018/0225088 A1    Aug. 9, 2018

(30) Foreign Application Priority Data
Feb. 8, 2017 (JP) ................ 2017-021188

(51) Int. Cl.
G06F 3/16 (2006.01)
G10L 25/51 (2013.01)

(52) U.S. Cl.
CPC .............. *G06F 3/167* (2013.01); *G10L 25/51* (2013.01)

(58) Field of Classification Search
CPC ......... G10L 15/22; G10L 15/26; G10L 15/00; G10L 25/48; G10L 13/027; G10L 13/033; G10L 13/08; G10L 2015/223; G10L 2015/225; G10L 2015/227; G10L 21/0364; G10L 25/15; G10L 25/63; H04R 1/1041; H04R 1/1083
USPC .............................. 381/56–58, 92, 1; 700/94
See application file for complete search history.

(56) References Cited

U.S. PATENT DOCUMENTS

| | | | | |
|---|---|---|---|---|
| 5,200,891 A * | 4/1993 | Kehr | ............. | A61J 7/0481 221/2 |
| 5,623,260 A * | 4/1997 | Jones | ............. | G08G 1/123 340/988 |
| 9,821,826 B2 * | 11/2017 | Yamada | ............. | B61L 25/025 |
| 2005/0124388 A1 * | 6/2005 | Seo | ............. | H04M 1/72552 455/566 |
| 2014/0143265 A1 * | 5/2014 | Kim | ............. | G06Q 10/107 707/758 |
| 2017/0293611 A1 * | 10/2017 | Tu | ............. | G06F 3/0482 |
| 2017/0337921 A1 * | 11/2017 | Aoyama | ............. | G10L 15/22 |
| 2018/0033424 A1 * | 2/2018 | Pechanec | ............. | G10L 15/22 |
| 2018/0060989 A1 * | 3/2018 | Hietanen | ............. | G01C 21/3423 |

FOREIGN PATENT DOCUMENTS

| | | | |
|---|---|---|---|
| JP | 2013-75611 A | 4/2013 | |
| WO | WO 2010/004629 | * 1/2010 | ............. H04N 5/445 |

* cited by examiner

*Primary Examiner* — Lun-See Lao
(74) *Attorney, Agent, or Firm* — Hauptman Ham, LLP

(57) ABSTRACT

An electronic device includes a sound input interface, and a controller configured to be capable of recognizing sound that is input to the sound input interface. The controller is configured to, once recognizing predetermined sound other than voice of a user, inform, if information included in the predetermined sound matches schedule information of the user, information including the matched schedule information.

20 Claims, 9 Drawing Sheets

FIG. 3

| APPLICATIONS | CATEGORIES | SCHEDULE INFORMATION | TRIGGERS TO STORE SCHEDULE INFORMATION |
|---|---|---|---|
| TRAIN TRANSFER GUIDE APP | INFORMATION ON DESTINATION STATION | STATIONS WHERE USER IS TO GET ON AND OFF TRAIN, SCHEDULED ARRIVAL TIME, NAME OF LINE | SETTING OF DESTINATION STATION |
| E-MAIL APP | FLIGHT INFORMATION | AIRLINE COMPANY, FLIGHT NUMBER, DESTINATION, SCHEDULED TIME FOR BOARDING | RECEIPT OF E-MAIL |
| CALENDAR APP | PLAN INFORMATION | PLACE OF EXECUTION, DATE AND TIME OF EXECUTION | INPUT OF PLAN INFORMATION |

FIG.4

| APPLICATIONS | CATEGORIES | SCHEDULE INFORMATION | RELEVANT INFORMATION |
|---|---|---|---|
| TRAIN TRANSFER GUIDE APP | INFORMATION ON DESTINATION STATION | STATIONS WHERE USER IS TO GET ON AND OFF TRAIN, SCHEDULED ARRIVAL TIME, NAME OF LINE | ANOTHER STATION ON LINE TO TAKE, "DEPARTURE", "NEXT STOP", "BEHIND SCHEDULE" |
| E-MAIL APP | FLIGHT INFORMATION | AIRLINE COMPANY, FLIGHT NUMBER, DESTINATION, SCHEDULED TIME FOR BOARDING | "BOARDING", "BEGIN", "SUSPENDED" |
| CALENDAR APP | PLAN INFORMATION | PLACE OF EXECUTION, DATE AND TIME OF EXECUTION | NAME OF PLACE NEAR PLACE OF EXECUTION, "WEATHER", "SUNNY" |

FIG. 6

| SCHEDULE INFORMATION | RELEVANT INFORMATION | INFORMATION INCLUDED IN TRAIN ANNOUNCEMENTS | MATCHED SCHEDULE INFORMATION | MATCHED RELEVANT INFORMATION | INFORMATION TO BE INFORMED | TYPES OF INFORMATION TO BE INFORMED |
|---|---|---|---|---|---|---|
| A LINE, SHINJUKU | YOTSUYA, NEXT STOP, MINUTE(S), BEHIND SCHEDULE | "NEXT STOP IS SHINJUKU." | "SHINJUKU" | / | "NEXT IS SHINJUKU STATION" | INFORMATION INCLUDING MATCHED SCHEDULE INFORMATION |
| A LINE, SHINJUKU | YOTSUYA, NEXT STOP, MINUTE(S), BEHIND SCHEDULE | "WE WILL SOON ARRIVE AT YOTSUYA." "WE WILL SOON ARRIVE AT SHINJUKU." | "SHINJUKU" | "YOTSUYA" | "NEXT IS SHINJUKU STATION" | INFORMATION INCLUDING MATCHED SCHEDULE INFORMATION |
| A LINE, SHINJUKU | YOTSUYA, NEXT STOP, MINUTE(S), BEHIND SCHEDULE | "THANK YOU FOR TAKING A LINE. NEXT STOP IS SHINJUKU." | "A LINE", "SHINJUKU" | / | "NEXT IS SHINJUKU STATION" | AT LEAST ONE OF PIECES OF INFORMATION INCLUDING MATCHED SCHEDULE INFORMATION |
| A LINE, SHINJUKU | YOTSUYA, NEXT STOP, MINUTE(S), BEHIND SCHEDULE | "THANK YOU FOR TAKING A LINE. NEXT STOP IS SHINJUKU." | "A LINE", "SHINJUKU" | "NEXT STOP" | "NEXT IS SHINJUKU STATION" | AT LEAST ONE OF PIECES OF INFORMATION INCLUDING MATCHED SCHEDULE INFORMATION |
| A LINE, SHINJUKU | YOTSUYA, NEXT STOP, MINUTE(S), BEHIND SCHEDULE | "NEXT STOP IS YOTSUYA." "NEXT STOP IS SHINJUKU." | "SHINJUKU" | "YOTSUYA" "NEXT STOP" | "NEXT STOP IS SHINJUKU STATION" | INFORMATION INCLUDING MATCHED SCHEDULE INFORMATION |
| A LINE, SHINJUKU | YOTSUYA, NEXT STOP, MINUTE(S), BEHIND SCHEDULE | "A LINE IS CURRENTLY RUNNING ABOUT 10 MINUTES BEHIND SCHEDULE." | "A LINE" | "BEHIND" "10 MINUTES" | "A LINE IS RUNNING 10 MINUTES BEHIND SCHEDULE" | INFORMATION INCLUDING MATCHED SCHEDULE INFORMATION AND MATCHED RELEVANT INFORMATION |

FIG. 7

| SCHEDULE INFORMATION | RELEVANT INFORMATION | INFORMATION INCLUDED IN AIRPORT ANNOUNCEMENTS | MATCHED SCHEDULE INFORMATION | MATCHED RELEVANT INFORMATION | INFORMATION TO BE INFORMED | TYPES OF INFORMATION TO BE INFORMED |
|---|---|---|---|---|---|---|
| ABC AIRLINES, TO TOKYO, FLIGHT 123 | SAN FRANCISCO AIRPORT, BOARDING, BEGIN | ABC Airlines flight 123 to Tokyo will begin boarding. | "to Tokyo" | | "FLIGHT TO TOKYO WILL BEGIN BOARDING" | INFORMATION INCLUDING MATCHED INFORMATION |
| ABC AIRLINES, TO TOKYO, FLIGHT 123 | SAN FRANCISCO AIRPORT, BOARDING, BEGIN | Thank you for using San Francisco airport. Airlines flight 123 to Tokyo will begin boarding. | "to Tokyo" | "San Francisco airport" | "FLIGHT TO TOKYO WILL BEGIN BOARDING" | INFORMATION INCLUDING MATCHED INFORMATION |
| ABC AIRLINES, TO TOKYO, FLIGHT 123 | SAN FRANCISCO AIRPORT, BOARDING, BEGIN | ABC Airlines flight 123 to Tokyo will begin boarding. | "ABC Airlines" "to Tokyo" "flight 123" | | "ABC AIRLINES FLIGHT 123 TO TOKYO WILL BEGIN BOARDING" | AT LEAST ONE OF PIECES OF INFORMATION INCLUDING MATCHED SCHEDULE INFORMATION |
| ABC AIRLINES, TO TOKYO, FLIGHT 123 | SAN FRANCISCO AIRPORT, BOARDING, BEGIN | ABC Airlines flight 123 to Tokyo will begin boarding. | "ABC Airlines" "to Tokyo" "flight 123" | "will begin boarding" | "ABC AIRLINES FLIGHT 123 TO TOKYO WILL BEGIN BOARDING" | AT LEAST ONE OF PIECES OF INFORMATION INCLUDING MATCHED SCHEDULE INFORMATION |
| ABC AIRLINES, TO TOKYO, FLIGHT 123 | SAN FRANCISCO AIRPORT, BOARDING, BEGIN | ABC Airlines flight 123 to Tokyo will begin boarding. | "ABC Airlines" "to Tokyo" "flight 123" | "will begin boarding" | "ABC AIRLINES FLIGHT 123 TO TOKYO WILL BEGIN BOARDING" | INFORMATION INCLUDING MATCHED SCHEDULE INFORMATION AND MATCHED RELEVANT INFORMATION |

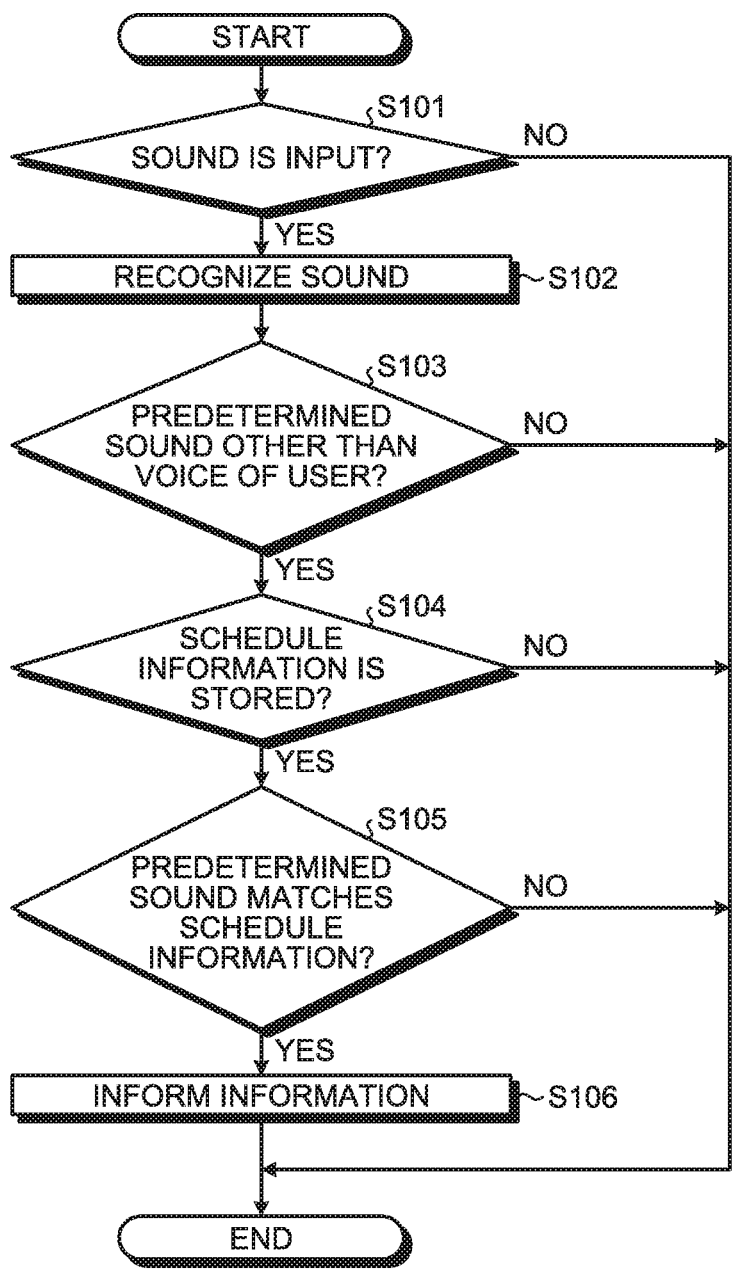

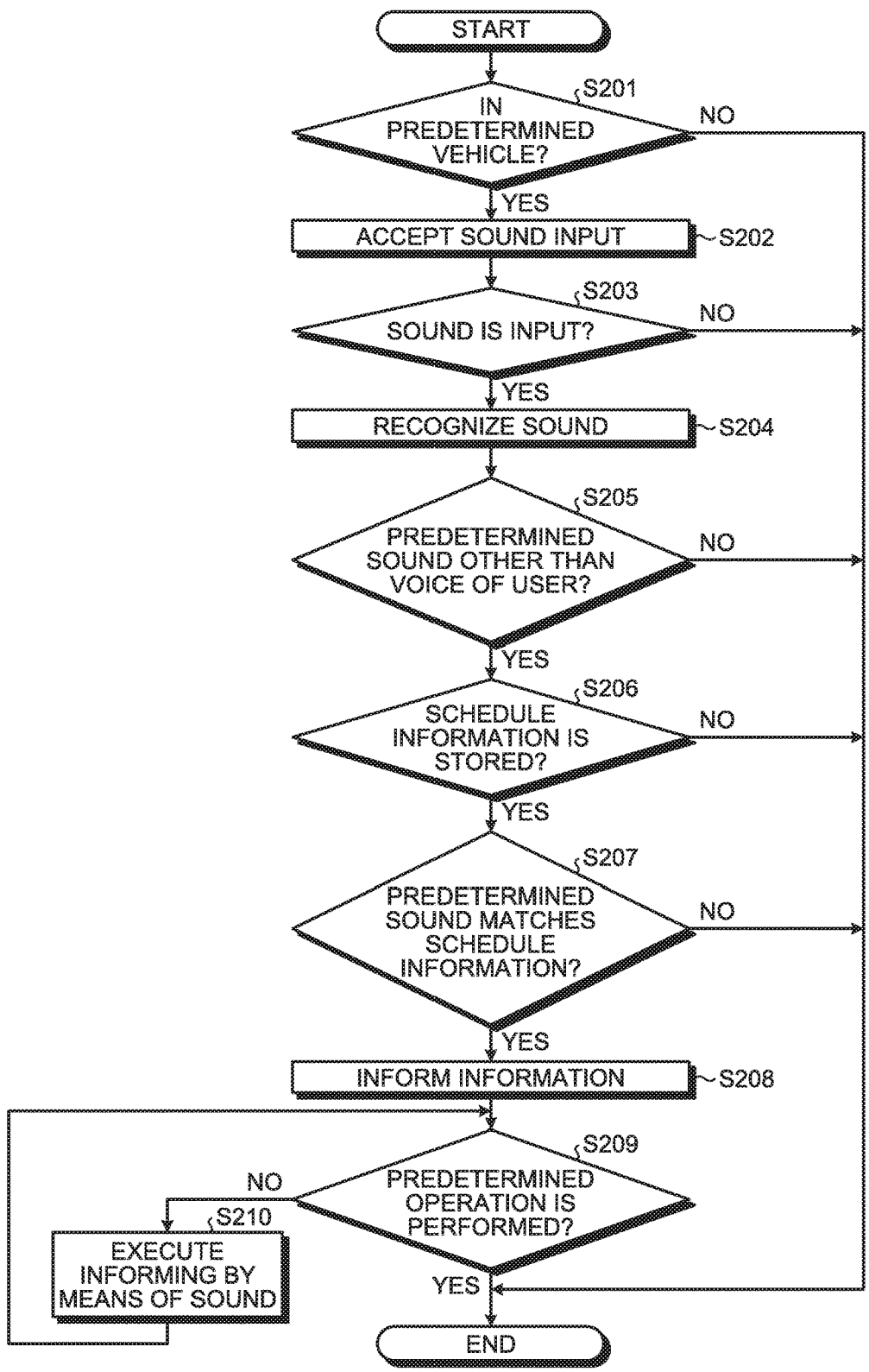

ELECTRONIC DEVICE, CONTROL METHOD, AND NON-TRANSITORY STORAGE MEDIUM

CROSS-REFERENCE TO RELATED APPLICATION

The present application claims priority under 35 U.S.C. § 119 to Japanese Patent Application No. 2017-021188, filed on Feb. 8, 2017, entitled "ELECTRONIC DEVICE, CONTROL METHOD, AND PROGRAM". The content of which is incorporated by reference herein in its entirety.

FIELD

The present application relates to an electronic device for providing information to users.

BACKGROUND

Train announcement systems including guide means that makes train announcements at predetermined timing on the basis of an on-board radio, a radio along a track, and information on the location of a train obtained by wireless communication between the on-board radio and the radio along a track have been disclosed in the conventional techniques.

SUMMARY

An electronic device according to one aspect includes: a sound input interface; and a controller that can recognize sound that is input to the sound input interface. The controller sets schedule information of a user in advance. Once recognizing predetermined sound other than voice of the user, the controller informs, if information included in the predetermined sound matches the schedule information, information including the matched schedule information.

A control method of an electronic device according to one aspect includes: a sound input interface; and a controller configured to be capable of recognizing sound that is input to the sound input interface. The control method includes: setting in advance schedule information of a user; recognizing predetermined sound other than voice of the user; and informing, if information included in the predetermined sound matches the schedule information, information including the matched schedule information.

A non-transitory storage medium that stores a control program according to one aspect causes, when executed by an electronic device including a sound input interface, and a controller configured to be capable of recognizing sound that is input to the sound input interface, to execute: setting in advance schedule information of a user; recognizing predetermined sound other than voice of the user; and informing, if information included in the predetermined sound matches the schedule information, information including the matched schedule information.

BRIEF DESCRIPTION OF THE DRAWINGS

FIG. 3 is a table associating user's schedule information with triggers to store the user's schedule information.

FIG. 4 is a table associating user's schedule information with relevant information highly related to the user's schedule information.

FIG. 6 is a table representing contents of recognized predetermined sound and a first example of processing to be executed accordingly.

FIG. 7 is a table representing contents of recognized predetermined sound and a second example of processing to be executed accordingly.

FIG. 8 is a flow chart representing a first example of control performed by the electronic device according to the embodiment.

FIG. 9 is a flow chart representing a second example of control performed by the electronic device according to the embodiment.

DETAILED DESCRIPTION

Figure 1:
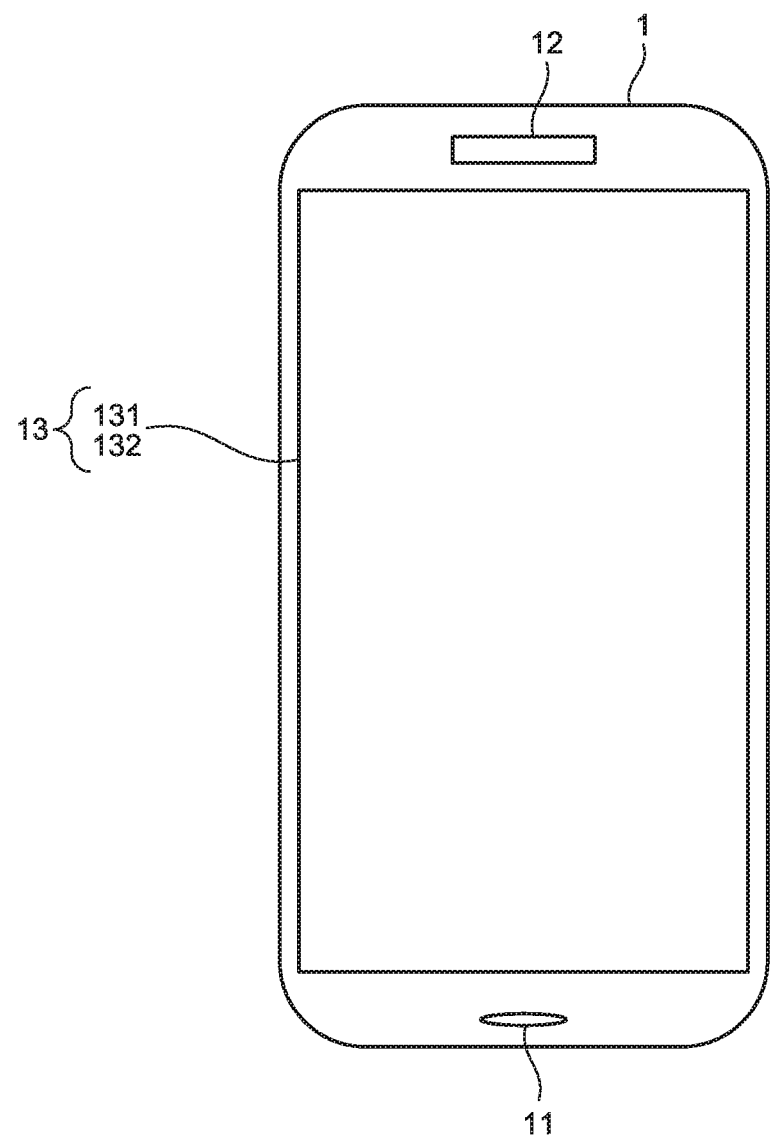
FIG. 1 is an external view of an electronic device according to an embodiment of the disclosure.

Embodiments of the present application will now be described in detail with reference to the drawings. Note however that the present application is not limited by the following embodiments. Components in the following description include what are called equivalents such as those that can be readily conceived by one of ordinary skill in the art and substantially the same components. In the description of the drawings, the same elements will be denoted by the same reference numerals and redundant description may be omitted. Persons may sometimes miss announcements provided, for example, in trains or at airports. Under such circumstances, the persons may suffer inconvenience. Even when the persons can hear an announcement, they may sometimes feel that information included in the announcement is insufficient. The present disclosure can provide the electronic device capable of informing a person of information included in an announcement more reliably, or capable of increasing information obtained from the announcement by the person.

An electronic device 1 according to an embodiment of the present application, which will be described below, may be, for example, a terminal such as what is called a smartphone. Note however that the electronic device 1 according to the embodiment of the present application is not limited to such a smartphone. Examples of the electronic device 1 include, but are not limited to, tablet computers, personal computers, on-board electronic devices, etc.

FIG. 1 is an external view of the electronic device 1 according to the present embodiment. As illustrated in FIG. 1, the electronic device 1 includes: a microphone 11 that serves as a sound input interface; a speaker 12 that serves as a sound output interface; and a touch panel 13.

The microphone 11 is one of input means that accept input to the electronic device 1. The microphone 11 collects sound therearound.

The speaker 12 is one of output means that make output from the electronic device 1. The speaker 12 outputs, for example, telephone voice and information of various programs by means of sound.

The touch panel 13 includes a touch sensor 131 and a display 132 that serves as a display.

The touch sensor 131 is another one of the input means that accept input to the electronic device 1. The touch sensor 131 detects contact made by a user's finger or a stylus, for example. While examples of a method for detecting such contact include, but are not limited to, a resistive method, a capacitance method, etc., any method may be employed.

The display 132 is another one of the output means that make output from the electronic device 1. The display 132 displays objects such as characters, images, symbols, and figures on a screen. Examples of the display 132 include, but are not limited to, liquid crystal displays and organic electroluminescence (EL) displays.

In the touch panel 13 of FIG. 1, the display 132 and the touch sensor 131 are provided in such a manner as to lie on top of each other, and a display region of the display 132 overlaps with the touch sensor 131. The present embodiment, however, is not limited thereto. The display 132 and the touch sensor 131 may be disposed side by side or may be disposed separately, for example. In the case of the display 132 and the touch sensor 131 overlapping with each other, one or a plurality of sides of the display 132 may not be aligned with any side of the touch sensor 131.

Figure 2:
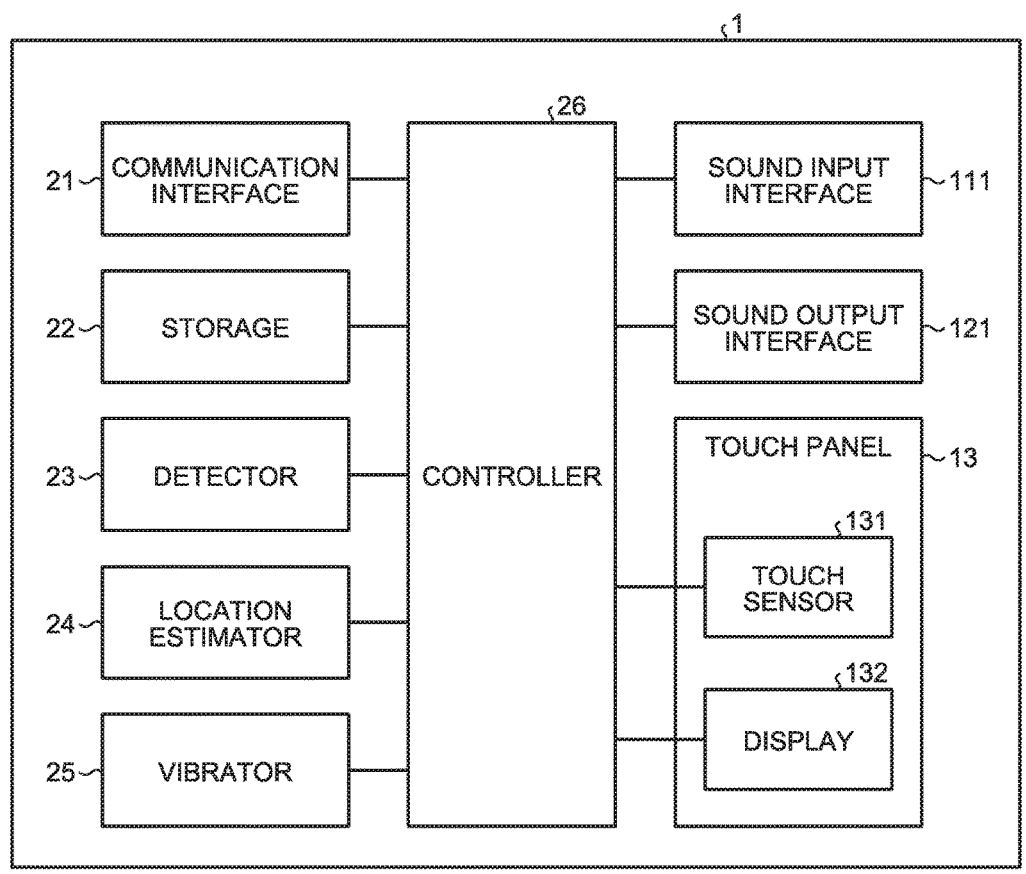
FIG. 2 is a block diagram illustrating a functional configuration of the electronic device according to the embodiment.

A functional configuration of the electronic device 1 will be described next with reference to FIG. 2. FIG. 2 is a block diagram illustrating the functional configuration of the electronic device 1. As illustrated in FIG. 2, the electronic device 1 includes a sound input interface 111, a sound output interface 121, the touch sensor 131, the display 132, a communication interface 21, a storage 22, a detector 23, a location estimator 24, a vibrator 25, and a controller 26.

The sound input interface 111 inputs a signal corresponding to sound accepted as input to the controller 26. The sound input interface 111 includes the above-described microphone 11. The sound input interface 111 may be an input interface capable of connecting with an external microphone. The external microphone is connected to the input interface with or without wires. The microphone connected to the input interface may be, for example, a microphone included in earphones capable of connecting with an electronic device.

The sound output interface 121 outputs sound on the basis of a signal that is input by the controller 26. The sound output interface 121 includes the above-described speaker 12. The sound output interface 121 may be an output interface capable of connecting with an external speaker. The external speaker is connected to the output interface with or without wires. The speaker connected to the output interface may be, for example, a speaker included in earphones capable of connecting with an electronic device.

The touch sensor 131 detects a contact operation performed by a finger, for example, and inputs a signal corresponding to the detected contact operation to the controller 26.

The display 132 displays objects such as characters, images, symbols, and figures on the screen on the basis of a signal that is input by the controller 26. The communication interface 21 makes wireless communication. Examples of wireless communication standards supported by the communication interface 21 include, but are not limited to, cellular phone communication standards such as 2G, 3G, and 4G, near field communication standards, etc. Examples of the cellular phone communication standards include, but are not limited to, long term evolution (LTE), wideband code division multiple access (W-CDMA), worldwide interoperability for microwave access (WiMAX), CDMA2000, personal digital cellular (PDC), global system for mobile communications (GSM (registered trademark)), personal handyphone system (PHS), etc. Examples of the near field communication standards include, but are not limited to, IEEE802.11, Bluetooth (registered trademark), infrared data association (IrDA), near field communication (NFC), wireless personal area network (WPAN), etc. An example of a WPAN communication standard is ZigBee (registered trademark). When the communication interface 21 makes wireless communication by a cellular phone communication standard, the communication interface 21 establishes a wireless network with a base station via a channel allocated by the base station and then makes telephone communication and information communication with the base station. Connection to a Wi-Fi (registered trademark) compliant access point (AP) allows the communication interface 21 to perform information communication via the AP.

The storage 22 stores programs and data. The storage 22 is used also as a workspace for temporarily storing processing results of the controller 26. The storage 22 may include any non-transitory storage medium such as a semiconductor storage medium and a magnetic storage medium. The storage 22 may include different types of storage media. The storage 22 may include a combination of a portable storage medium, such as a memory card, an optical disk, or a magneto-optical disk, and a device for reading such a storage medium. The storage 22 may include a storage device used as a temporal storage area, such as a random access memory (RAM). Programs stored in the storage 22 include applications executed in the foreground or background and control programs that support the operations of the applications.

The storage 22 stores user's schedule information (hereinafter, also referred to simply as schedule information) as text information. The schedule information may exactly be predetermined text information held as data by various applications. The schedule information may be stored in another place within the storage 22 on the basis of the text information held by the various applications. In such a case, the schedule information may be stored not by means of a user's operation but automatically, or may be stored after the user determines whether the information is stored as schedule information. Examples of the user's schedule information include, but are not limited to, information on a station where the user is scheduled to get off a train and the name of a line, which is set in a train transfer guide application (hereinafter, an application is also referred to as an app), information on a flight the user is scheduled to board, which is written in a message or an attached file in an e-mail app, plan information that is input in a calendar app, etc. The schedule information, however, is not limited thereto. The schedule information may also include temporal information such as schedule execution time specified by the user, scheduled time for boarding a flight, scheduled time of arrival at the user's destination, scheduled time of arrival at a station where the user is scheduled to get off a train, or amounts of time required for these schedules.

The storage 22 may store relevant information highly related to the user's schedule information. Such relevant information may be set depending on the type of the user's schedule information. The relevant information may also be set depending on the type of the application. The relevant information refers to, for example, information included in predetermined sound and routinely output at predetermined time intervals or at every predetermined place. Such routinely-output information may also include a proper noun and/or the name of a place, for example. The relevant information refers to, for example, information that is output in the absence of the routine information output. In other words, the relevant information may be information that is output from the predetermined sound when a failure or trouble occurs. Specific information (character string) may be set as the relevant information and may be set as the schedule information described above.

The storage 22 stores sound recognition dictionary data, recognized sound data, and language processing data. The sound recognition dictionary data refers to data associating feature patterns (feature quantities) of sounds with character strings. The recognized sound data refers to data associating information such as sound volume, musical pitch, intonation, and frequencies with various sounds to be recognized. The language processing data refers to data associating a predetermined character string with predetermined processing that can be executed by the controller 26. The predetermined character string is, for example, the aforementioned user's schedule information. The predetermined processing may be executed if it is determined by the controller 26 that information included in the predetermined sound matches the predetermined character string.

The storage 22 stores language translation dictionary data. The language translation dictionary data refers to data associating character strings in a predetermined language with character strings in a language different from the predetermined language that have equivalent meanings to those in the predetermined language. The predetermined language and the language different from the predetermined language are official languages around the world such as English, Japanese, and Chinese.

The detector 23 detects states of the electronic device 1 and inputs the detected results to the controller 26. The detector 23 includes at least an acceleration sensor. The detector 23 may further include a gyro sensor, a direction sensor, and the like. The acceleration sensor detects the direction and magnitude of acceleration exerted on the electronic device 1. The gyro sensor detects the angle and angular velocity of the electronic device 1. The direction sensor detects a geomagnetic direction.

The location estimator 24 estimates location information indicating the current location of the electronic device 1 and inputs the estimated result to the controller 26. The location estimator 24 detects the location of the electronic device 1 on the basis of the base station with which a global positioning system (GPS) receiver or the communication interface 21 has established the wireless network, for example.

The vibrator 25 operates on the basis of a signal that is input by the controller 26. An example of the vibrator is a vibration motor such as an eccentric motor. The vibrator, however, is not limited thereto. The operation of the vibrator 25 causes the entire electronic device 1 to vibrate.

The controller 26 is an arithmetic processing device. Examples of the arithmetic processing device include, but are not limited to, a central processing unit (CPU), a system-on-a-chip (SoC), a micro control unit (MCU), a field-programmable gate array (FPGA), a coprocessor, etc. The controller 26 integrally controls the operations of the electronic device 1 to implement various functions.

The controller 26 executes a wide variety of control such as executing a function of the electronic device 1 and changing settings on the basis of a signal that is input according to a contact operation detected by the touch sensor 131, for example.

The controller 26 detects changes in acceleration and tilt of the electronic device 1 on the basis of the detected results of the detector 23. By detecting changes in acceleration and tilt of the electronic device 1, the controller 26 detects that the electronic device 1 has transitioned to a state being held by the user from a state not being held by the user and that the electronic device 1 has transitioned to the state not being held by the user from the state being held by the user. The controller 26 also detects that the user has transitioned to a moving state from an unmoving state and that the user has transitioned to the unmoving state from the moving state. The controller 26 also detects that the user has transitioned to a state in which the user is aboard a predetermined vehicle from a state in which the user is not aboard a vehicle and that the user has transitioned to a state in which the user is not aboard a predetermined vehicle from a state in which the user is aboard a vehicle.

The controller 26 recognizes location information indicating the current location of the user on the basis of the estimated result of the location estimator 24.

The controller 26 recognizes sound (sound recognition) by analyzing sound that is input to the sound input interface 111. As sound recognition processing, the controller 26 retrieves a character string from the sound recognition dictionary data stored in the storage 22 on the basis of the feature pattern of the input sound. When retrieving the character string, the controller 26 collates the sound recognition dictionary data with the feature pattern of the input sound to determine the degree of similarity therebetween.

By analyzing the sound that is input to the sound input interface 111, the controller 26 identifies the source of the sound. As sound recognition processing, the controller 26 collates the recognized sound data stored in the storage 22 with the sound volume, musical pitch, intonation, frequency, and the like of the input sound to determine the degree of similarity therebetween. In this manner, the controller 26 can identify the source of the input sound. That is, the controller 26 can identify, for example, the voice of the user, the sound of an announcement, ambient sound emitted by a vehicle such as a train, etc.

Once the controller 26 recognizes predetermined sound, the controller 26 informs, if information included in the predetermined sound matches schedule information, information including the matched schedule information. The information included in the predetermined sound refers to the aforementioned character string retrieved from the sound recognition dictionary data when the controller 26 recognizes the predetermined sound. Such informing of information is executed on the basis of the aforementioned language processing data.

The controller 26 determines whether the above informing processing is executed depending on the type of the source of the sound identified on the basis of the recognized sound data. If the recognized sound comes from the voice of the user, the controller 26 executes no informing processing. If the recognized sound comes from predetermined sound other than the voice of the user (hereinafter, also referred to simply as predetermined sound), the controller 26 executes the informing processing. Examples of the predetermined sound other than the voice of the user include, but are not limited to, an announcement in a train or on a platform, an announcement at an airport, sound from a television, etc. In other words, the predetermined sound other than the voice of the user is language sound that is output by a predetermined sound signal.

Once recognizing the predetermined sound other than the voice of the user in the case where the relevant information highly related to the user's schedule information (hereinafter, also referred to simply as relevant information) is prestored in the storage 22, the controller 26 may inform, if information included in the predetermined sound matches the schedule information and the relevant information, information including the matched schedule information.

Once recognizing the predetermined sound other than the voice of the user, the controller 26 may inform, if information included in the predetermined sound matches pieces of schedule information, at least one of the pieces of information including the matched schedule information.

Once recognizing the predetermined sound other than the voice of the user, the controller 26 may inform, if information included in the predetermined sound matches the schedule information and the relevant information, information including the matched relevant information.

Once recognizing the predetermined sound other than the voice of the user, the controller 26 may execute informing with the use of a piece of schedule information, and any one of temporal information included in the predetermined sound, time at which the predetermined sound is recognized, and location information indicating the current location of the user.

The controller 26 may execute informing via a predetermined application.

On the basis of temporal information included in the schedule information, and temporal information included in the predetermined sound or time at which the predetermined sound is recognized, the controller 26 may determine if the predetermined sound is related to the schedule information. Only when it is determined that the predetermined sound is related to the schedule information, the controller 26 may execute informing. Such relevance determination may be made, for example, by determining if a temporal difference between the temporal information included in the schedule information, i.e., time at which the schedule is going to be carried out and time at which the predetermined sound is announced, falls within a predetermined amount of time. The predetermined amount of time varies depending on the type of the predetermined sound. For example, an announcement regarding the next stop, which will be announced immediately before arriving at a station where the user is scheduled to get off a train, is typically made within a few minutes before stopping at the station. Regarding airport announcements, for example, an announcement for encouraging the start of boarding is typically made several tens of minutes ahead of the time at which the user is scheduled to board.

On the basis of the location information indicating the current location of the user, and place information included in the predetermined sound, the controller 26 may determine if the predetermined sound is related to the schedule information. Only if it is determined that the predetermined sound is related to the schedule information, the controller 26 may execute informing. Such relevance determination may be made, for example, by determining if a distance difference between the location information indicating the current location of the user and the place information included in the predetermined sound falls within a predetermined range.

The controller 26 may execute informing in a used language set in advance in the electronic device 1, which is different from the language of the recognized predetermined sound. That is, the controller 26 may determine that information included in recognized sound in a predetermined language matches user information in a language (used language set in advance in the electronic device 1) different from the predetermined language if character strings in these languages have equivalent meaning, and then execute informing. After translating the recognized predetermined sound on the basis of the language translation dictionary data, the controller 26 may determine if information included in the translated predetermined sound matches the user information in the used language set in advance in the electronic device 1.

The controller 26 may constantly accept the input of sound without providing timing for starting and stopping the acceptance of sound input.

By recognizing ambient sound that is input to the sound input interface, the controller 26 may determine, on the basis of the ambient sound, if the user is aboard a predetermined vehicle. If it is determined that the user is aboard the predetermined vehicle, then the controller 26 may recognize predetermined sound that is input other than the voice of the user.

The controller 26 may accept the input of sound if it is determined, on the basis of the detected results of the detector 23, that the user is aboard the predetermined vehicle.

The controller 26 may accept the input of sound if the user is within a predetermined range centered around a predetermined place.

The controller 26 may accept the input of sound if a predetermined application is running. The application may be running in the foreground or in the background.

If the sound output interface 121 is an output interface capable of connecting with external speakers and an external speaker is connected to the output interface, the controller 26 may inform information via the external speaker only, or the external speaker and the display 132. If the sound output interface 121 is a speaker included in the electronic device 1, the controller 26 may inform information via the display 132 only.

If the sound input interface 111 is an input interface capable of connecting with external microphones and an external microphone is connected to the input interface, the controller 26 may accept sound via the external microphone.

If no predetermined operation is performed by the user within a predetermined amount of time after the informing of the information, the controller 26 may execute informing by means of sound or vibration.

If it is determined, on the basis of the detected results of the detector 23, that the user has not moved for a predetermined amount of time since the informing of the information, then the controller 26 may execute informing by means of sound or vibration.

If the user moves out of a predetermined range centered around a predetermined place after the informing of the information, the controller 26 may execute informing by means of sound or vibration.

If the controller 26 recognizes the predetermined sound again after the informing of the information, the controller 26 may execute informing by means of sound or vibration.

Types of user's schedule information and triggers to store such information as the user's schedule information will be described next with reference to FIG. 3.

FIG. 3 is an exemplary table associating applications to be the source of information when the user's schedule information is stored, categories of the schedule information, contents of the user's schedule information, and triggers to store the schedule information with one another. As illustrated in FIG. 3, when operations to be various triggers depending on the applications are performed, the user's schedule information is stored in the storage 22.

Information related to the user's schedule information will be described next with reference to FIG. 4.

FIG. 4 is an exemplary table associating applications to be the source of information when user's schedule information is stored, categories of the schedule information, and relevant information highly related to the user's schedule information with one another. As illustrated in FIG. 4, the relevant information may differ depending on the schedule information.

Figure 5A:
FIGS. 5A to 5C are illustrative drawings representing an exemplary operation of the electronic device according to the embodiment.
Figure 5C:
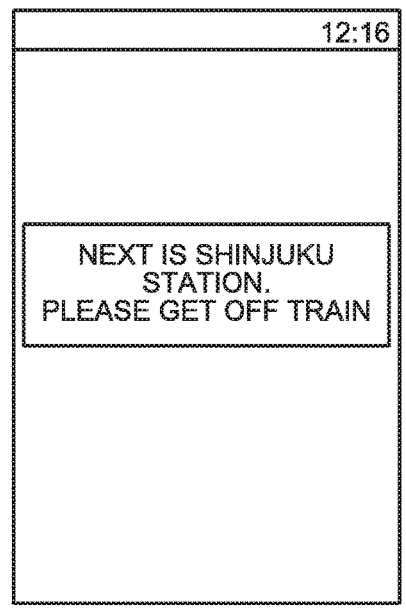
Figure 5B:
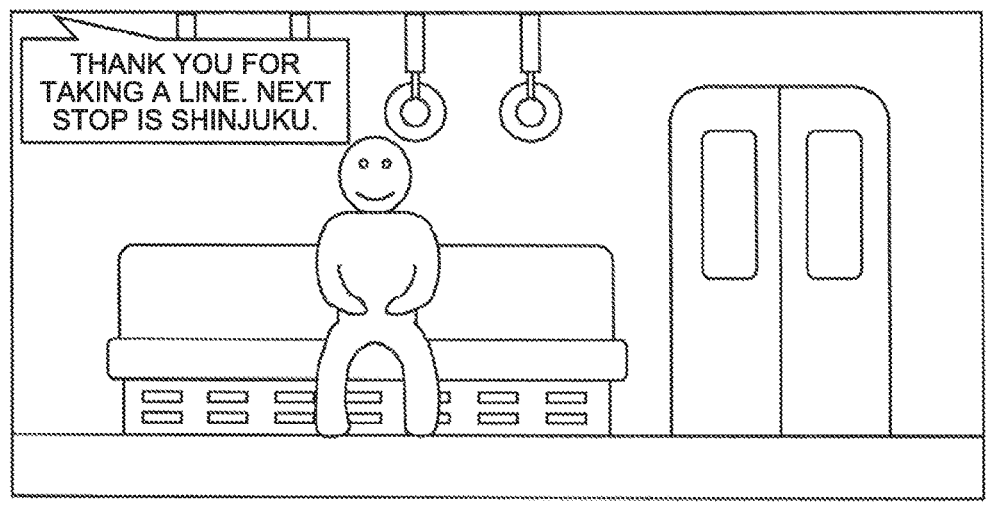

With reference to FIGS. 5A to 5C, an exemplary operation of the electronic device 1 will be described next. FIGS. 5A to 5C are illustrative drawings representing the exemplary operation of the electronic device 1. Specifically, FIGS. 5A to 5C illustrate a case where a user carries the electronic device 1, and the user gets on a train after using a transfer guide app to search desired stations where the user is scheduled to get on and get off the train. The controller 26 recognizes the sound of an announcement that is input to the sound input interface 111 and performs processing on the basis of the recognized sound.

FIG. 5A illustrates a screen of a search result displayed as a result of inputting a destination to the train transfer app of the electronic device 1 when the user gets on the train. On the screen, the A Line is displayed as the line to take, Tokyo Station as the station where the user is scheduled to get on the train, and Shinjuku Station as the station where the user is scheduled to get off the train. The current time is 12:00, and the user is scheduled to get on the train at Tokyo Station at 12:03 and arrive at Shinjuku Station at 12:18.

At this time, the line to take, the station where the user is scheduled to get on the train, scheduled time for getting on the train, the station where the user is scheduled to get off the train, scheduled time for getting off the train, etc., are stored in the storage 22 as the user's schedule information.

The following description will be made assuming that "Shinjuku" is stored as the name of the station where the user is scheduled to get off the train, the "A Line" as the name of the line, and text information of "next stop" as the relevant information highly related to the user's schedule information.

FIG. 5B illustrates a situation where an announcement is made while the user is aboard the train. The contents of the announcement are "Thank you for taking the A Line. The next stop is Shinjuku." This announcement is made predetermined time before the stop at Shinjuku Station.

FIG. 5C illustrates a screen displayed in the electronic device 1 when the announcement is made. On the basis of the information on the station where the user is scheduled to get off the train, the controller 26 informs that the user should get off the train at the next station by displaying characters of "The next is Shinjuku Station." on the display 132.

In the operation of FIGS. 5A to 5C, once recognizing the sound of "Shinjuku" in the announcement in the train, the controller 26 collates the contents of the announcement with the information on the station where the user is scheduled to get off the train, which is stored in the storage 22. As the result of the collation, the controller 26 detects that the character string of "Shinjuku" included in the announcement matches the information on the station where the user is scheduled to get off the train. Once the controller 26 detects such a match, the controller 26 executes processing to inform the user of information to notify that the next station is the station where the user is scheduled to get off the train.

As described above, once recognizing the predetermined sound other than the voice of the user, the controller 26 informs, if information included in the predetermined sound matches the user's schedule information, information including the matched schedule information. This allows the electronic device 1 to provide the information included in the predetermined sound to the user. Thus, a possibility that inconvenience is caused to the user missing the announcement can be reduced.

If information included in the predetermined sound matches the user's schedule information ("Shinjuku") and the relevant information ("next stop"), for example, the controller 26 may perform processing to inform information including the matched schedule information ("The next is Shinjuku Station"). This allows the electronic device 1 to provide useful information having a high possibility to be more related to the user's schedule information while reducing a possibility that inconvenience is caused to the user missing the announcement. In other words, it is possible to prevent the information that has been missed, but is unneeded, by the user from being informed of.

If information included in the predetermined sound matches pieces of user's schedule information ("A Line" and "Shinjuku" are matched), for example, the controller 26 may perform processing to inform at least one of the pieces of information including the matched schedule information ("The next is Shinjuku Station"). This also allows the electronic device 1 to provide useful information having a high possibility to be more related to the user's schedule information while reducing a possibility that inconvenience is caused to the user missing the announcement. In other words, it is possible to prevent the information that has been missed, but is unneeded, by the user from being informed of.

When the controller 26 informs at least one of the pieces of information including the matched schedule information, priority for whether informing is performed may be set in advance depending on the type of the schedule information. In FIGS. 5A to 5C, for example, between first schedule information ("A Line") and second schedule information ("Shinjuku"), higher priority may be given to the second schedule information ("Shinjuku"). In this case, if information included in the predetermined sound matches the user's first schedule information ("A Line") and the second schedule information ("Shinjuku"), the controller 26 may inform information including the matched second schedule information. In FIGS. 5A to 5C, it can be said that information on the destination (the station where the user is scheduled to get off the train) or date and time (date and time when the user gets on and off the train) is more valuable than information on means (the line to take) for the user.

In FIG. 5C, the screen displays "The next is Shinjuku Station." as information indicating that the matched information has been recognized. Information including the matched schedule information may be, for example, information included in the predetermined sound (i.e., the sound-recognized text information). Information including the matched schedule information may also be, for example, a phrase including the matched text information in the information included in the sound.

In FIG. 5C, the controller 26 may output, for example, the display of "The next is Shinjuku Station. Please get off the train." to inform information including the matched schedule information. As just described, information to be informed may include, for example, the contents of an action to be taken by the user on the basis of the matched schedule information, "Shinjuku," and the function of the application of interest (train transfer guide app). This allows the user to obtain, from the information to be informed, more information than the information included in the predetermined sound. The information other than the matched schedule information, included in the information to be informed, is not limited thereto. Information to be informed, including the matched schedule information, may be prestored in the storage 22 depending on the type of the matched schedule information. Such information, however, may be determined, for example, on the basis of the time at which the predetermined sound is recognized, the location information of the user, etc.

On the basis of the scheduled time of arrival at the station where the user is scheduled to get off the train and the time at which the announcement is recognized, the controller 26 may determine if the sound of the announcement is related to the user's schedule information. Only if the sound of the announcement is related to the user's schedule information, the controller 26 may perform informing. The scheduled time of arrival at Shinjuku Station is 12:18, and the time at which the announcement is recognized is 12:16, for example, although not illustrated in FIG. 5B. In this case, informing may be executed after it is determined that the sound of the announcement is related to the user's schedule information. This allows the electronic device 1 to prevent the execution of informing if predetermined sound less related to the user's schedule information is recognized. Thus, a possibility of annoying the user by providing unnecessary information can be reduced. The controller 26 may determine if the predetermined sound is related to the user's schedule information on the basis of temporal information included in the predetermined sound without being limited to the time at which the predetermined sound is recognized.

On the basis of location information indicating the current location of the user and place information included in the predetermined sound, the controller 26 may determine if the predetermined sound is related to the user's schedule information. Once recognizing information of "Shinjuku" included in the predetermined sound when the location information of the user indicates that the user is within one kilometer of Shinjuku Station, for example, the controller 26 may determine that the sound of the announcement is related to the user's schedule information and may execute informing. This also allows the electronic device 1 to prevent the informing of information if predetermined sound less related to the user's schedule information is recognized. Thus, a possibility of annoying the user by providing unnecessary information can be reduced.

Information to be informed to the user if the controller 26 recognizes predetermined sound will be described next with reference to FIGS. 6 and 7.

FIGS. 6 and 7 are each an exemplary table associating predetermined sound recognized by the controller 26, matched information included in the predetermined sound (user's schedule information, and relevant information highly related to the user's schedule information), and types of information to be informed with one another.

In FIG. 6, the information of "A Line" (the line to take) and "Shinjuku" (the station where the user is scheduled to get off the train) is stored in the storage 22 in association with each other as the user's schedule information. The information of "Yotsuya," "next stop," "minute(s)," and "behind schedule" is also stored in the storage 22 as the relevant information. Yotsuya is the name of the station next to Shinjuku Station.

Once recognizing a train announcement as the predetermined sound, the controller 26 determines if information included in the announcement matches the schedule information. The controller 26 also determines if the information included in the announcement matches the relevant information. The controller 26 informs information on the basis of the determined results.

As illustrated in FIG. 6, if information ("A Line is currently running 10 minutes behind schedule.") included in the predetermined sound (the train announcement) matches the schedule information (the A Line) and the relevant information ("behind schedule"), the controller 26 may inform information including the matched relevant information as one of pieces of information including the matched schedule information. That is, information including both the schedule information ("A Line") and the relevant information ("behind schedule") may be informed.

Also by executing processing represented in the table of FIG. 6, which is different from the operation described with reference to FIGS. 5A to 5C, the electronic device 1 can provide useful information more related to the user's schedule information while reducing a possibility that inconvenience is caused to the user missing the announcement. In other words, it is possible to prevent the information that has been missed, but is unneeded, by the user from being informed of. The electronic device 1 can also provide the user with more information than the information included in the predetermined sound.

FIG. 7 represents the contents of airport announcements and processing corresponding to such announcements. In FIG. 7, information such as "ABC Airlines" (airline company), "to Tokyo" (destination), and "flight 123" (flight number) is stored in association with one another in the storage 22 as the user's schedule information. Information such as "boarding" and "begin" is stored in the storage 22 as the relevant information highly related to the user's schedule information.

In FIG. 7, the controller 26 recognizes sound of English, and executes informing to the user in Japanese if the meaning of information included in the sound of English matches the meaning of user information in Japanese. This allows the user to obtain information concerning his or her own schedule from the announcement for which the user cannot understand what is being said. Thus, the electronic device 1 can reduce a possibility that inconvenience is caused to the user unable to understand the announcement.

The controller 26 may execute informing with the use of at least one of pieces of schedule information and time at which the sound is recognized. For example, it is assumed that information on the station where the user is scheduled to get off the train and information on arrival time are stored in the storage 22 in association with each other as the user's schedule information. In this case, if information included in an announcement matches the user's schedule information (the station where the user is scheduled to get off the train) while the user is aboard the Shinkansen, for example, the controller 26 can inform information on how many minutes it takes to get to the station where the user is scheduled to get off the train by subtracting time at which the sound is recognized from the scheduled arrival time. In this case, information to be informed may be, for example, information such as "The next is XX. It takes 30 minutes to arrive." This also allows the user to obtain, from the information to be informed, more information than the information included in the predetermined sound.

The controller 26 may execute informing with the use of at least one of pieces of schedule information and location information indicating the current location of the user. For example, information such as the airline company, the flight number, and the boarding gate is stored in the storage 22 in association with one another as the schedule information. Information such as "boarding" and "begin" is stored in the storage 22 as the relevant information. In this case, if information included in an announcement matches the user's schedule information (the airline company and the flight number) and the relevant information ("boarding" and "begin"), for example, the controller 26 can inform the user of directions to the boarding gate with the use of location information of the boarding gate and the location information of the user. In this case, information to be informed may be, for example, information such as "XX Airlines flight YY has begun boarding. Go straight from the current location and turn right at the end to get to the boarding gate." This also allows the user to obtain, from the information to be informed, more information than the information included in the predetermined sound.

The controller 26 may execute informing via a predetermined application. More specifically, in the above navigation example, for example, guide informing via a navigation app may be executed following the informing via the text information. This allows the electronic device 1 to provide information more interactive than the information of a mere character string, thus improving the convenience for the user.

The predetermined application may be a transfer guide app, for example. According to an embodiment of the present invention, when an announcement informing the delay of a train ("The A Line is currently running about 10 minutes behind schedule.") is made as represented in FIG. 6, for example, information on an alternate route may be informed on the transfer guide app in addition to the information of "The A Line is running about 10 minutes behind schedule" as information including the matched schedule information and the matched relevant information. When information such as a scheduled transfer station and the station where the user is scheduled to get off the train is stored as schedule information, for example, the alternative route may be searched with the use of the schedule information and the location information of the user.

When the scheduled transfer station and transfer time of the user are stored as schedule information, the informing of the alternate route may be performed on the basis of determination by the controller 26 that the train cannot arrive at the scheduled transfer station at the transfer time of the user due to the delay, which is made by adding 10 minutes to the scheduled transfer time (or determination that a temporal difference between the transfer time and the arrival time is less than or equal to a predetermined amount of time). In other words, the controller 26 may execute informing with the use of the user's schedule information and the temporal information included in the predetermined sound.

The processing performed by the controller 26 to determine information match as described above is not limited to the complete match of character strings. In other words, the processing to determine information match may be processing to determine similarity in information. When the text information of "arrive at Shinjuku Station" is stored as the user's schedule information, for example, the controller 26 may determine that, if a character string recognized from predetermined sound is "will arrive at Shinjuku Station," the information of the predetermined sound matches the user's schedule information. The controller 26 may determine if there is a similarity therebetween by various techniques such as comparing the pieces of character information (text) with each other and calculating the number of common characters and/or the number of common characters adjacent to a certain character.

With reference to FIGS. 8 and 9, control executed by the electronic device 1 will be described next.

FIG. 8 is a flow chart representing a first example of the control performed by the electronic device 1. The control performed by the electronic device 1 in FIG. 8 corresponds to the operation of the electronic device 1 in FIGS. 5A to 5C.

The controller 26 determines if sound has been input (Step S101). If no sound is input (No in Step S101), then the controller 26 ends the processing. If sound has been input (Yes in Step S101), then the controller 26 recognizes the sound (Step S102).

The controller 26 determines if the recognized sound is predetermined sound other than the voice of the user (Step S103). If it is determined that the recognized sound is not the predetermined sound other than the voice of the user (No in Step S103), then the controller 26 ends the processing. If it is determined that the recognized sound is the predetermined sound other than the voice of the user (Yes in Step S103), then the controller 26 proceeds to Step S104. The predetermined sound is the announcement of "Thank you for taking the A Line. The next stop is Shinjuku." made in the train in FIG. 5B.

The controller 26 determines if user's schedule information is stored in the electronic device 1 (Step S104). If no user's schedule information is stored in the electronic device 1 (No in Step S104), then the controller 26 ends the processing. If the user's schedule information is stored in the electronic device 1 (Yes in Step S104), then the controller 26 proceeds to Step S105.

The controller 26 determines if the recognized predetermined sound matches the user's schedule information (Step S105). If it is determined that the recognized predetermined sound matches no user's schedule information (No in Step S105), then the controller 26 ends the processing. If it is determined that the recognized predetermined sound matches the user's schedule information (Yes in Step S105), then the controller 26 informs information including the matched information (Step S106).

In the control of FIG. 8, sound input is constantly accepted without providing timing for starting and stopping the acceptance of sound input. This eliminates the need for an operation, which is performed by the user, to be a trigger to cause the electronic device 1 to execute sound recognition, thus improving the operability of the electronic device 1.

By recognizing predetermined ambient sound in input sound, the controller 26 may determine if a user is aboard a predetermined vehicle on the basis of the ambient sound. Only if it is determined that the user is aboard the predetermined vehicle, the controller 26 may recognize the predetermined sound that is input. The predetermined vehicle refers to, for example, a train, and the predetermined ambient sound refers to, for example, running sound of the train. The predetermined sound refers to an announcement made in the train. This eliminates the need for an operation, which is performed by the user, to be a trigger to cause the electronic device 1 to execute sound recognition. In addition, the electronic device 1 can reduce a possibility of falsely recognizing the input sound.

If the sound input interface 111 is an input interface capable of connecting with external microphones and an external microphone is connected to the input interface, the sound input in Step S101 may be performed by the external microphone. This can reduce a possibility of failing to recognize sound by reducing sound blocking by clothes or the like, which could occur when the user puts the electronic device 1 in his or her pocket, for example.

If the sound output interface 121 is an output interface capable of connecting with external speakers and an external speaker is connected to the output interface, the informing of the information in Step S106 may be output via the external speaker only, or via the external speaker and the display 132. This allows the user to obtain the information without the need to check the display 132. The external sound output interface is earphones connected to the electronic device 1, for example. In this case, the user can obtain the information by means of sound without performing any operation and without leaking the sound to the surroundings.

The processing to determine if the information included in the recognized predetermined sound matches the user's schedule information in Step S105 may be processing that is based on any one of the examples represented in the tables of FIGS. 6 and 7.

FIG. 9 is a flow chart representing a second example of the control performed by the electronic device 1.

The controller 26 determines if the electronic device 1 is in a predetermined vehicle (Step S201). If it is determined that no electronic device 1 is in the predetermined vehicle (No in Step S201), then the controller 26 ends the processing. If it is determined that the electronic device 1 is in the predetermined vehicle (Yes in Step S201), then the controller 26 accepts sound input (Step S202). Examples of the predetermined vehicle include, but are not limited to, trains, automobiles, airplanes, etc.

The controller 26 determines if sound has been input (Step S203). If no sound is input (No in Step S203), then the controller 26 ends the processing. If sound has been input (Yes in Step S203), then the controller 26 recognizes the sound (Step S204).

The controller 26 determines if the recognized sound is predetermined sound other than the voice of the user (Step S205). If it is determined that the recognized sound is not the predetermined sound other than the voice of the user (No in Step S205), then the controller 26 ends the processing. If it is determined that the recognized sound is the predetermined sound other than the voice of the user (Yes in Step S205), then the controller 26 proceeds to Step S206.

The controller 26 determines if user's schedule information is stored in the electronic device 1 (Step S206). If no user's schedule information is stored in the electronic device 1 (No in Step S206), then the controller 26 ends the processing. If the user's schedule information is stored in the electronic device 1 (Yes in Step S206), then the controller 26 proceeds to Step S207.

The controller 26 determines if the recognized predetermined sound matches the user's schedule information (Step S207). If it is determined that the recognized predetermined sound matches no user's schedule information (No in Step S207), then the controller 26 ends the processing. If it is determined that the recognized predetermined sound matches the user's schedule information (Yes in Step S207), then the controller 26 informs information including the matched information (Step S208).

The controller 26 determines if a predetermined operation is performed by the user within a predetermined amount of time after the informing of the information (Step S209). If it is determined that no predetermined operation has been performed by the user within the predetermined amount of time (No in Step S209), then the controller 26 executes informing by means of sound (Step S210) and returns to Step S209. In this case, timing for executing the informing by means of sound again may be set any time. If no predetermined operation is performed by the user, the controller 26 repeats Step S209 at any time intervals. If it is determined that the predetermined operation has been performed by the user within the predetermined amount of time (Yes in Step S209), then the controller 26 ends the processing. While an example of the predetermined amount of time is a few minutes, the predetermined amount of time is not limited thereto. The predetermined amount of time may be determined on the basis of a temporal difference between the time at which the schedule is to be executed and the time at which the predetermined sound is provided. Examples of the predetermined operation may include, but are not limited to, touching an object indicating the existence of information that has been informed on the display 132 to check the contents of the information, touching a predetermined object provided on a screen on which the information that has been informed is displayed, etc. The object indicating the existence of the information that has been informed is displayed in a notification area or on a lock screen. The notification area is, for example, provided in an upper part on the screen of the display 132 for displaying information corresponding to events such as the receipt of an e-mail and a missed call by means of characters or objects such as icons. Information displayed in the notification area may be displayed also on a lock screen initially displayed after the display 132 is resumed from the sleep mode, for example.

In the control of FIG. 9, if it is determined that the user is aboard the predetermined vehicle, then the controller 26 accepts sound input. This allows the electronic device 1 to reduce a possibility of falsely recognizing sound while accepting sound input under circumstances where the predetermined sound is more likely to be provided.

In the control of FIG. 9, if no predetermined operation is performed by the user within the predetermined amount of time after the informing of the information, the controller 26 performs informing by means of sound or vibration. This allows the electronic device 1 to inform the user of the existence of the information that has been informed again when there is a high possibility that the information that has been informed has not been noticed yet by the user. Thus, a possibility that the user is unable to know the information that has been informed can be reduced.

The processing to determine if the user is aboard the predetermined vehicle in Step S201 may be processing to determine if the user is within a predetermined range centered around a predetermined place. The predetermined place is, for example, a ticket gate at the station where the user is scheduled to get off the train, and being within the predetermined range refers to, for example, being within a one-kilometer radius of the predetermined place. The predetermined place and being within the predetermined range, however, are not limited thereto. This also allows the electronic device 1 to reduce a possibility of falsely recognizing sound while accepting sound input under circumstances where the predetermined sound is more likely to be provided.

Alternatively, the processing to determine if the user is aboard the predetermined vehicle in Step S201 may be processing to determine if a predetermined application is running. The predetermined application may be, for example, an app for setting the allowance and disallowance of sound input and the sound recognition of predetermined sound, which is provided in the electronic device 1. When the predetermined application is an app for setting the allowance and disallowance of sound input and the sound recognition of predetermined sound, the user can determine whether information is to be informed on one's own will. Thus, the occurrence of unnecessary informing can be reduced. The predetermined application may be, for example, a music reproduction app that could block the user from hearing predetermined sound. When the predetermined application is a music reproduction app, the electronic device 1 can reduce a possibility of falsely recognizing sound while recognizing predetermined sound under circumstances where there is a high possibility that the user cannot hear the predetermined sound.

The processing to determine if the predetermined operation is performed by the user within the predetermined amount of time in Step S209 may be processing to determine if the user moves within the predetermined amount of time. If it is determined that the user has not moved within the predetermined amount of time, i.e., if the user has not moved for the predetermined amount of time, then the controller 26 executes informing by means of sound (Step S210). This also allows the electronic device 1 to inform the user of the existence of the information that has been informed again when there is a high possibility that the information that has been informed has not been noticed yet by the user. Thus, a possibility that the user is unable to know the information that has been informed can be reduced.

Alternatively, the processing to determine if the predetermined operation is performed by the user within the predetermined amount of time in Step S209 may be processing to determine if the user moves out of a predetermined range centered around a predetermined place. If it is determined that the user has moved out of the predetermined range, then the controller 26 executes informing by means of sound (Step S210). The predetermined place is, for example, a ticket gate at the station where the user is scheduled to get off the train, and being out of the predetermined range refers to, for example, being out of a one-kilometer radius of the predetermined place. The predetermined place and being out of the predetermined range, however, are not limited thereto. This also allows the electronic device 1 to inform the user of the existence of the information that has been informed again when there is a high possibility that the information that has been informed has not been noticed yet by the user. Thus, a possibility that the user is unable to know the information that has been informed can be reduced.

Alternatively, the processing to determine if the predetermined operation is performed by the user within the predetermined amount of time in Step S209 may be processing to determine if sound is input and if the sound is predetermined sound. If it is determined that sound has been input and the sound is predetermined sound, then the controller 26 executes informing by means of sound (step S210). Specifically, if the controller 26 recognizes, in the train, the sound of an announcement on the station where the train is scheduled to arrive following the station where the user should get off the train after informing the user of the station where the user should get off the train, for example, the controller 26 executes informing by means of sound. This also allows the electronic device 1 to inform the user of the existence of the information that has been informed again when there is a high possibility that the information that has been informed has not been noticed yet by the user. Thus, a possibility that the user is unable to know the information that has been informed can be reduced.

The informing by means of sound in Step S210 may be informing by means of vibration.

The processing to determine if information included in the recognized predetermined sound matches the user's schedule information in Step S207 may be processing that is based on any one of the examples represented in the tables of FIGS. 6 and 7.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile electronic device, comprising:
a sound input interface; and
a controller configured to perform language sound recognition on sound that is input to the sound input interface, wherein
the controller is configured to
in response to
recognizing, by said language sound recognition, that the sound is other than voice of a user, and
a character string, that is retrieved by said language sound recognition from the sound, matching a predetermined character string in schedule information of the user,
inform information including the matched schedule information.

2. The mobile electronic device according to claim 1, wherein the controller is configured to
set in advance relevant information related to the schedule information that has been set in advance, and
in response to
the character string, that is retrieved by said language sound recognition from the sound, matching the predetermined character string in the schedule information, and
a further character string, that is further retrieved by said language sound recognition from the sound, matching a further predetermined character string in the relevant information,
inform the information including the matched schedule information.

3. The mobile electronic device according to claim 2, wherein the controller is configured to
set in advance the relevant information according to an application, and
in response to
the character string, that is retrieved by said language sound recognition from the sound, matching the predetermined character string in the schedule information, and
said further character string, that is further retrieved by said language sound recognition from the sound, matching said further predetermined character string in the relevant information,
inform the information including the matched schedule information.

4. The mobile electronic device according to claim 1, wherein the controller is configured to
in response to the character string, that is retrieved by said language sound recognition from the sound, matching a plurality of predetermined character strings in the schedule information,
inform at least one of the plurality of predetermined character strings in the matched schedule information.

5. The mobile electronic device according to claim 2, wherein the controller is configured to
in response to
the character string, that is retrieved by said language sound recognition from the sound, matching the predetermined character string in the schedule information, and
the further character string, that is further retrieved by said language sound recognition from the sound, matching the further predetermined character string in the relevant information,
inform information including the matched relevant information.

6. The mobile electronic device according to claim 1, further comprising
a location estimator configured to estimate location information of the electronic device, wherein
the controller is configured to execute the informing with use of
the matched schedule information, and
at least one of
temporal information included in the sound,
time at which the sound is recognized, or
the location information indicating a current location of the electronic device as estimated by the location estimator.

7. The mobile electronic device according to claim 6, wherein the controller is configured to execute the informing via a predetermined application.

8. The mobile electronic device according to claim 1, wherein the controller is configured to
determine whether the sound is related to the schedule information on a basis of
temporal information included in the schedule information, and
temporal information included in the character string retrieved by said language sound recognition from the sound or time at which the sound is recognized; and
execute the informing in response to a determination that the sound is related to the schedule information.

9. The mobile electronic device according to claim 1, further comprising
a location estimator configured to estimate location information of the electronic device, wherein
the controller is configured to
determine whether the sound is related to the schedule information on a basis of
location information indicating a current location of the electronic device as estimated by the location estimator, and
place information included in the character string retrieved by said language sound recognition from the sound; and
execute the informing in response to a determination that the sound is related to the schedule information.

10. The mobile electronic device according to claim 1, wherein the controller is configured to
recognize sound in a predetermined language, and
execute the informing in a used language of the electronic device that is set in advance and different from the predetermined language.

11. The mobile electronic device according to claim 1, wherein the controller is configured to accept input of the sound constantly.

12. The mobile electronic device according to claim 11, wherein the controller is configured to
recognize ambient sound that is input to the sound input interface to determine whether the user is aboard a vehicle on a basis of the ambient sound, and
recognize the sound that has been input in response to a determination that the user is aboard the vehicle.

13. The mobile electronic device according to claim 1, further comprising
a detector configured to detect a movement of the electronic device, wherein
the controller is configured to accept input of the sound in response to a determination that the user is aboard a vehicle on a basis of a detected result of the detector.

14. The mobile electronic device according to claim 1, further comprising
a location estimator configured to estimate location information indicating a current location of the electronic device, wherein
the controller is configured to accept input of the sound in response to a determination that the user is within a predetermined range centered around a predetermined place on a basis of the location information estimated by the location estimator.

15. The mobile electronic device according to claim 1, wherein the controller is configured to accept input of the sound when a predetermined application is running.

16. The mobile electronic device according to claim 1, further comprising:
a display; and
a sound output interface, wherein
the controller is configured to
execute, in response to the sound output interface being configured to connect to an external speaker and the external speaker being connected to the sound output interface, the informing via the external speaker only, or via the external speaker and the display; and
execute, in response to the sound output interface being a speaker in the electronic device, the informing via the display only.

17. The mobile electronic device according to claim 11, wherein the controller is configured to accept, in response to the sound input interface being configured to connect to an external microphone and the external microphone being connected to the sound input interface, the sound via the external microphone.

18. The mobile electronic device according to claim 1, further comprising:
a sound output interface; and
a vibrator, wherein
the controller is configured to perform the informing by sound or vibration in response to a determination that
no predetermined operation is performed by the user within a predetermined amount of time after executing informing, or
the user has not moved for a predetermined amount of time after executing informing.

19. A control method of a mobile electronic device comprising a sound input interface, and a controller configured to perform language sound recognition on sound that is input to the sound input interface, the control method comprising:
setting in advance schedule information of a user; and
in response to
recognizing, by said language sound recognition, that the sound is other than voice of the user, and
a character string, that is retrieved by said language sound recognition from the sound, matching a predetermined character string in the schedule information of the user,
informing information including the matched schedule information.

20. A non-transitory storage medium that stores a control program for causing, when executed by a mobile electronic device comprising a sound input interface, and a controller configured to perform language sound recognition on sound that is input to the sound input interface, the device to execute:

setting in advance schedule information of a user; and
in response to
  recognizing, by said language sound recognition, that the sound is other than voice of the user, and
  a character string, that is retrieved by said language sound recognition from the sound, matching a predetermined character string in the schedule information of the user,
informing information including the matched schedule information.

* * * * *